United States Patent
Guzdar et al.

[15] 3,662,524
[45] May 16, 1972

[54] CENTRIFUGE AGGLOMERATOR - SEPARATOR

[72] Inventors: Adi R. Guzdar, Sudbury; Alve J. Erickson, Cambridge; Andrew C. Harvey, Boston, all of Mass.

[73] Assignee: The United States of America as represented by the Secretary of the Air Force

[22] Filed: Apr. 21, 1970

[21] Appl. No.: 30,425

[52] U.S. Cl. .................................. 55/400, 233/31, 233/33, 233/36
[51] Int. Cl. ................ B01d 45/00, B01d 46/18, B01d 46/30
[58] Field of Search ................ 55/400; 233/30, 31, 33, 36, 233/42

[56] References Cited

UNITED STATES PATENTS 507,442  10/1893  Lentsch .................................. 233/30
2,772,749  12/1956  Nerad et al. .............................. 55/400
3,072,323  1/1963  Stoermer .................................. 233/33

Primary Examiner—Howard R. Caine
Attorney—Harry A. Herbert, Jr. and Charles H. Wagner

[57] ABSTRACT

A centrifuge agglomerator water particle separator which comprises a motor driven elongated multicellular rotary agglomerator in which each cell acts to convert relatively small water droplets in air passing through the cells in the agglomerator into relatively large water droplets in the downstream end of the rotary agglomerator by centrifugal action, which are discharged through holes, that are provided in the aft end of the agglomerator, into a water bleed line, while the air from which the water droplets are removed is separately discharged through an air outlet located concentrically beyond the downstream end of the multicellular rotary agglomerator.

3 Claims, 6 Drawing Figures

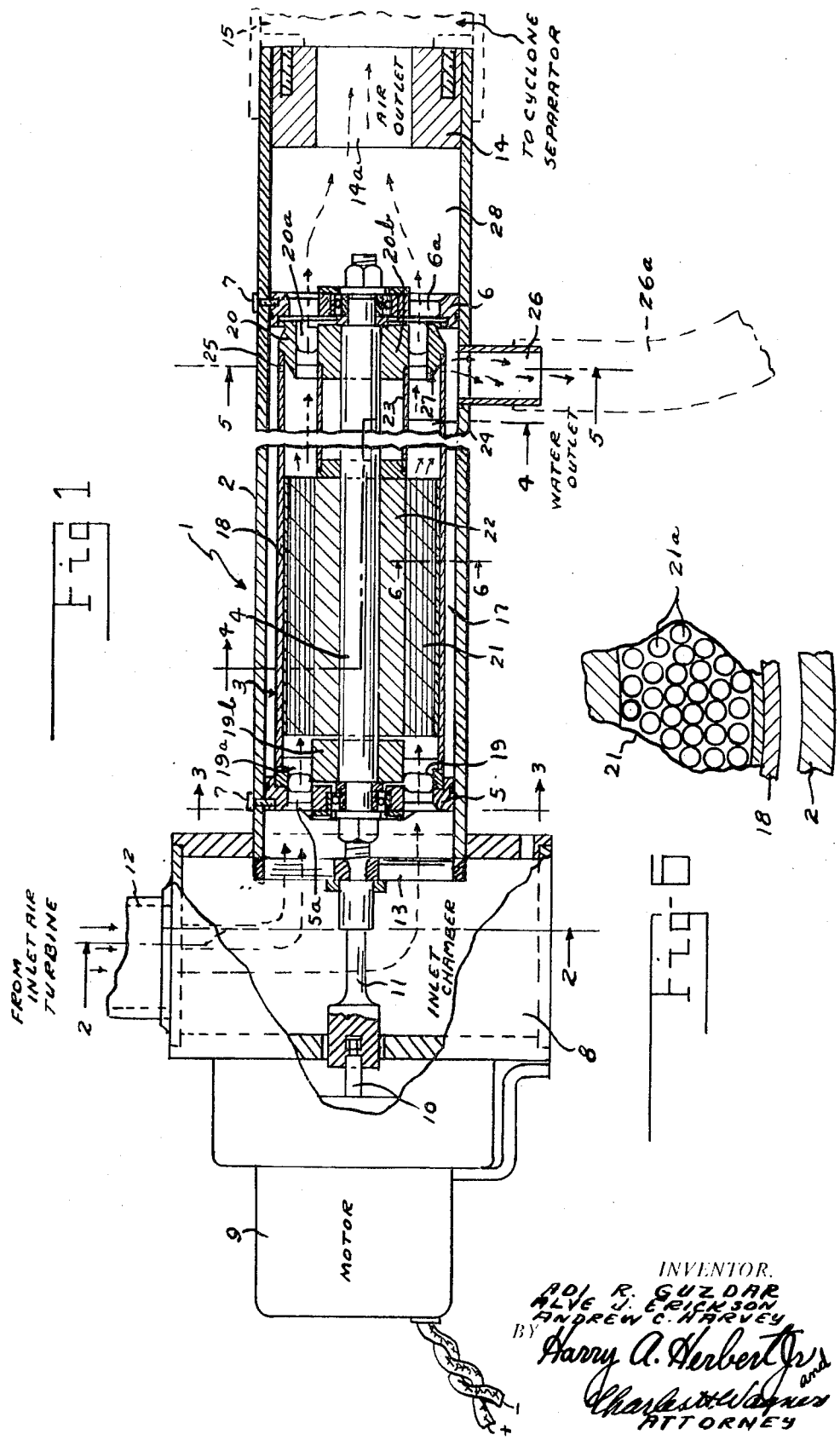

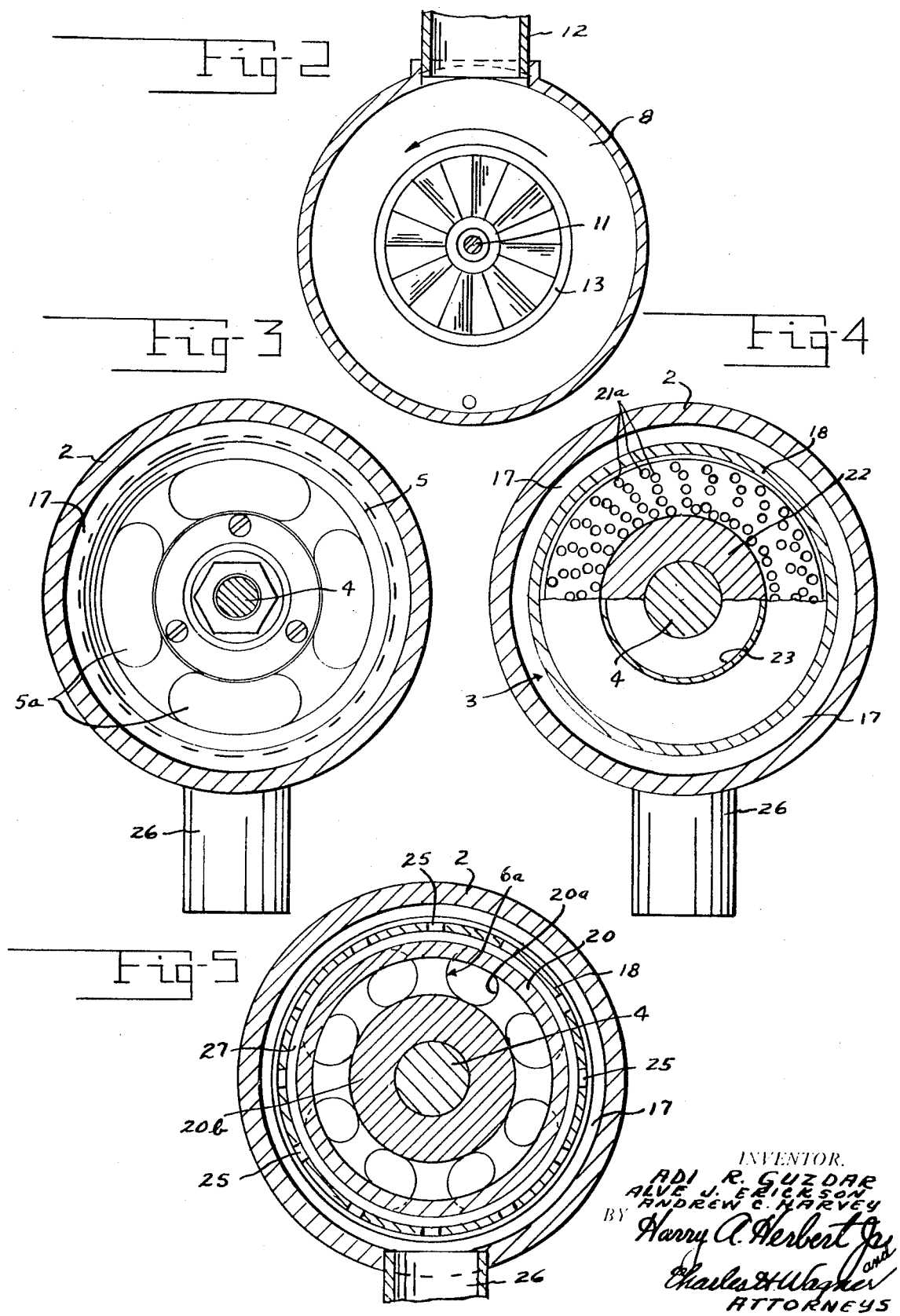

CENTRIFUGE AGGLOMERATOR - SEPARATOR

BACKGROUND OF THE INVENTION

Various means and apparatus have been previously suggested and used to separate entrained water droplets from an air flow, including the use of absorbent filters through which the air flow is passed. Also, many different centrifugal devices have likewise been utilized for the same purpose. However, while most of these devices have been reasonably effective to separate the larger droplets of water entrained in a gas or air stream, they have not been entirely successful in separating and removing very fine entrained water droplets in the air stream.

The present invention is an improved apparatus of the centrifugal separation type in which a high velocity stream of relatively small water-particle-laden air is directed into a rotary agglomerator comprising a bundle of elongated small tubular cells disposed in a group around a rotary axis, and means for spinning the group of cells at relatively high speed around the axis, while passing a stream of water-particle-laden air through the cells, and utilizing the centrifugal action thereof to throw the droplets outwardly toward the cell walls where they form a film which flows downstream of the cells where it is reentrained in the air flow in the form of large drops. The relatively large drops are thereafter centrifuged to an outer rotating wall by the swirling action of the air leaving the agglomerator, and passed through radial holes into a water collection system. The droplet free air travels along the inner portion of the elongated cells and is discharged through a central opening at the downstream end of the separator system.

IN THE DRAWING

Like reference characters refer to like parts on the several figures of the drawings in which:

FIG. 1 is a vertical longitudinal sectional view through a centrifuge agglomerator separator incorporating the invention, parts being shown in elevation.

FIG. 2 is a transverse sectional view taken about on the plane indicated by line 2—2 in FIG. 1 and looking in the direction of the arrows.

FIG. 3 is a transverse sectional view taken about on line 3—3 in FIG. 1.

FIG. 4 is a transverse sectional view through the agglomerator log, taken about on line 4—4 in FIG. 1.

FIG. 5 is a sectional view taken about on line 5—5 in FIG. 1.

FIG. 6 is an enlarged fragmental transverse sectional view, taken through the agglomerator apparatus about on line 6—6 in FIG. 1.

Referring to the drawings and more particularly to FIG. 1 the reference numeral 1 denotes a motor driven centrifugal air cleaner and conditioning device generally, having an elongated cylindrical casing 2 in which the rotary agglomerator unit is journalled and indicated generally at 3.

The unit 3 is mounted centrally in the casing 2 on a driven shaft 4 which is journalled in apertured supporting "spider" plates 5 and 6, secured in spaced relation in the casing 2 by suitable means 7 substantially as shown. A larger air intake casing 8 is fixed on the upstream end of the casing 2 and carries a motor or power means 9 having a drive shaft 10 which is suitably connected to the agglomerator unit shaft 4 by a suitably splined coupling 11.

Air containing water droplets is supplied into the intake casing 8 through an air inlet conduit 12, and a suitable air impeller or fan 13 may be mounted on the shaft 4 to accelerate delivery of the air from the intake casing 8 through openings, at 5a, in the shaft supporting spider plate 5 into the upstream end of the agglomerator unit 3.

The air, after passing through the agglomerator unit 3, passes out through openings, at 6a, in the other shaft supporting spider plate 6 into the downstream end of the casing 2 and out through a central opening 14a in an insert 14 positioned at the downstream end of the casing 2 and from where it may be withdrawn by a suitable power driven separator (not shown) such as a "cyclone separator," to thereby ensure the further removal of any of the relatively large water droplets that might still be present in the exhausted air. The downstream end of the casing 2 is connected to the cyclone separator by a suitable air delivery conduit 15.

The agglomerator unit 3 comprises an inner, relatively short and cylindrical cellular log member 21 and an outer, relatively elongated cylindrical shell or tube 18 that may be made, if desired, of a material such as aluminum, and which is mounted, on opposite ends thereof, on a pair of apertured supporting circular end members 19 and 20 having air inlet and outlet openings 19a and 20a which are disposed for alignment respectively with the openings 5a and 6a in the respective supporting spider plates 5 and 6. The outer peripheries of the end members 19 and 20 rotate in close tolerance in the annular recessed perimeters formed in an appropriate side of each of supporting spider plates 5 and 6 as shown to restrict air leakage around the ends of the outer shell 18 into a space 17 that is inherently formed between the interior of the casing 2 and the outer surface of the shell 18. The cylindrical cellular log member 21 of the agglomerator unit 3, which is in the shape of and may constitute an annulus, preferably having a length of about 5 inches, an outer diameter of about 3 ¼ inches and an inner diameter of about 2 inches, incorporates a plurality of relatively elongated and spaced-apart parallel cells each comprising a duct, as indicated at 21a, that may be about 1/16 inch in diameter and 5 inches long. The inner diameter of the cellular annulus 21 comprising the said log member is preferably not reduced below the 2 inch diameter because the centrifugal field decreases with the radius and a diameter less than the inner 2 inch diameter portion is not sufficiently effective for agglomeration. Also the elongated tubular cells 21a should preferably be subject to approximately the same degree of centrifugal field.

The cylindrical cellular log member 21 is enclosed and bonded to the concentric cylindrical tube or shell 18 which may be aluminum, for example, and which has a length of about 5 ¼ inches.

In addition to the cellular log member 21, the present rotary agglomerator unit 3 further comprises an elongated concentric cylindrical inner spacer sleeve or hub member, indicated at 22, on which the cellular log member 21 is mounted in fixed relation. Said sleeve or hub members 22 is, in turn, fixed on the drive shaft 4 with one end thereof almost disposed against a central hub portion 19b of the apertured supporting end member 19.

A relatively short, inner cylindrical and rotating, hollow shell member 23 of relatively reduced diameter is interconnected between and for simultaneous rotation with, and further extends between the downstream end of the cylindrical hub member 22 and a central hub portion, at 20b of the downstream apertured supporting end member 20 to thereby provide an enlarged water collection chamber 24, between the outer surface of the said rotating shell member 23 and the inner surface of the outer shell or tube 18, for receiving the separated relatively large water droplets which have been previously massed or formed by the centrifugal action of, and thereafter slung off of the downstream ends of the elongated tubular cells 21a.

The relatively large water droplets collect in the chamber 24 and, because of centrifugal force, flow radially outward toward the periphery of the supporting end member 20 and are discharged out of the agglomerator unit 3 and the chamber 24 through the radial apertures 25 into the outer casing 2, and through a water outlet conduit 26, 26a.

The inner peripheral portion of the supporting end member 20, for the agglomerator unit 3, is formed with an annular water deflector bevel portion 27 which inclines inwardly toward the cellular log member 21 from the location of the water outlet holes 25 to deflect any water droplets or accumulation of water in the chamber 24 toward the water outlet holes 25 as the agglomerator unit 3 spins.

The outer casing 2 is, of course, spaced from the periphery of the rotary agglomerator unit 3, substantially as shown, and is approximately 16 ½ inches long by 4 inches inside diameter and is provided with an annular collection chamber 28 which extends downstream beyond the end of the unit 3 and the downstream apertured spider plate 6 through which the air from the cells 21a is discharged, and the air is withdrawn from this air collection chamber 28 through the central opening 14a in the end closure 14 in the end of the casing 2 and may be passed through the connecting conduit 15, if desired.

The agglomerator unit 3 is preferably rotated at relatively high speeds, for instance 10,000 to 16,000 RPM, which causes the air containing the water droplets to enter the multicellular agglomerator where each little cell acts as a separate centrifuge.

The air carrying relatively small water droplets, for example enters the spinning multicellular agglomerator unit 3, where each little elongated cell 21a acts as a centrifuge. The said water droplets are driven outwardly by centrifugal force to the cell walls where they impact and agglomerate to form a film in each cell, which in turn flows to the downstream end of the cell to be ripped off and reentrained in the chamber 24 by, and in, the airflow as relatively large drops. The air coming out of the agglomerator cellular log member 21 is swirling with the high tangential velocity of the agglomerator unit 3 and, as such, centrifuges the reentrained, relatively large water droplets outwardly to the inside wall surface of the outer rotating shell or tube 18 where the water is collected and flows out through the holes 25 into the water bleed line 26, 26a.

We claim:

1. A combined agglomerator and separator device for separating relatively small entrained water droplets from an air flow comprising; a first, fixed, outer cylinder of a predetermined length and having a main, air inlet at its upstream end, a first, main outlet at its opposite, downstream end and a second intermediately positioned outlet upstream of said first, main outlet and forming a first and a second chamber on opposite sides thereof in said first, outer cylinder; a second, agglomerator-support cylinder of a length less than that of said first, outer cylinder, and being rotatably mounted relative thereto and mounted between said main, air inlet and said intermediately-positioned, outer cylinder-outlet; a third, agglomerator cylinder fixed within, and to said second, agglomerator-support cylinder for simultaneous rotation therewith within said first, fixed, outer cylinder, said third, agglomerator cylinder being of a length shorter than that of said second, agglomerator-support cylinder and having inlet means in direct alignment with, and thereby receiving the air flow from the main, air inlet, outlet means in spaced relation from, and in communication with, the side of said first chamber opposite from said second, intermediately-positioned outlet of said first, outer cylinder, and air flow-passage means disposed between said inlet and outlet means for receiving an air flow admitted through said main, air inlet; and combined mounting and driven-shaft means for rotating said third, agglomerator cylinder and the air flow in said air flow-passage means at relatively high speed to thereby centrifugally separate the relatively small water droplets entrained therein into relatively large water droplets formed or agglomerated into a film on the wall surfaces of the air flow-passage means for their subsequent discharge downstream and reentrainment with the swirling air flow in said first chamber; said first chamber having radial openings in communication with water discharge means for exhausting the reentrained relatively large water droplets subsequently being centrifugally separated by the continuing rotation being imparted to said air flow, and further having a centrally disposed and axially aligned opening means formed in and by the second intermediately positioned outlet of said first cylinder for exhausting the substantially water droplet-free air flow into said second chamber.

2. In a combined agglomerator and separator device as in claim 1, wherein said air flow-passage means comprises at least one, relatively elongated duct.

3. In a combined agglomerator and separator device as in claim 1, wherein said air flow-passage means comprises a plurality of relatively elongated, spaced-apart and parallel tubular cells.

* * * * *